(No Model.)
J. CONWAY.
GRAIN DRILL.
No. 284,186. Patented Sept. 4, 1883.
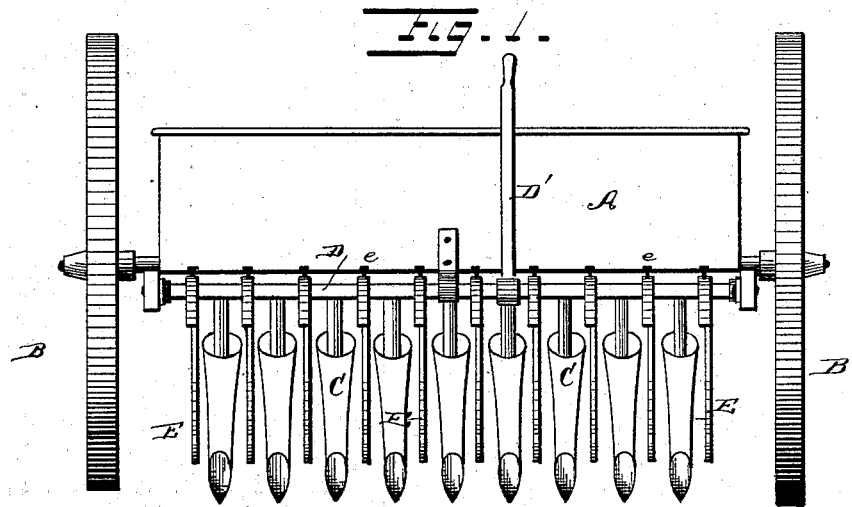
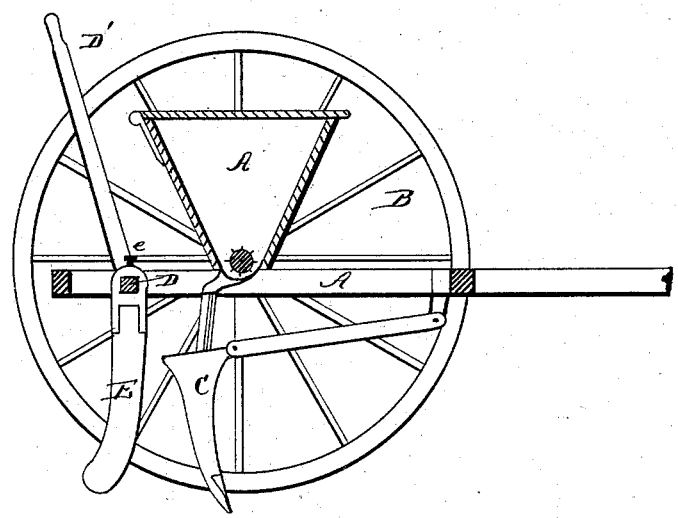
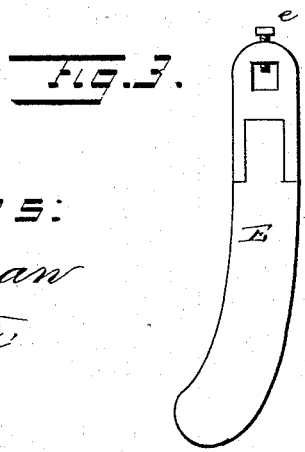
Witnesses:
C. L. Carman
N. C. McArthur
Inventor
John Conway
per
H. Harrison
Attorney

UNITED STATES PATENT OFFICE.

JOHN CONWAY, OF LONDON, OHIO.

GRAIN-DRILL.

SPECIFICATION forming part of Letters Patent No. 284,186, dated September 4, 1883.

Application filed March 29, 1883. (No model.)

*To all whom it may concern:*

Be it known that I, JOHN CONWAY, a citizen of the United States of America, residing at London, in the county of Madison, State of Ohio, have invented certain new and useful Improvements in Grain-Drills, of which the following is a specification, to wit:

This invention relates to grain-drills; and it consists in a series of clearing-arms secured to a rock-shaft in close relation to and adapted to be swung past the hose, substantially as will be hereinafter more fully set forth.

In order to enable others skilled in the art to which my invention appertains to make and use the same, I will now proceed to describe its construction and operation, referring to the accompanying drawings, in which—

Figure 1 is a rear elevation, and Fig. 2 a longitudinal vertical section, of a grain-drill having my invention attached; and Fig. 3 is a detail view of one of the clearing-arms.

A represents the main frame and seed-box of a grain-drill, constructed in any of the usual and well-known ways, and mounted upon wheels B. This frame is also provided with the usual drill tubes or holes, C C, hinged and adapted to be raised and lowered at will. In the frame A is also journaled a rock-shaft, D, provided with an operating-lever, D', within convenient reach of the operator, and upon this shaft are placed a series of steel clearing arms or fingers, E, adjustably secured by set-screws *e*. These arms or fingers hang down in close relation to the hoes C C, and when these hoes become clogged with weeds or grass, the operator by throwing down the lever D' operates the rock-shaft D, and the fingers C are carried forward past the hoes and then brought back again, thus effectually clearing them of obstructions without stopping the team or leaving his seat.

The arms may be placed nearer to or farther from the hose, as may be desirable, by means of the adjusting-screws *e*, and should any become broken it may be replaced by a new one without trouble.

Having thus fully described my invention, what I claim as new, and desire to secure by Letters Patent, is—

The combination, with the drill-spouts C, of the rock-shaft D, having lever D', and the adjustable and removable clearing-fingers E E, mounted upon said shaft, substantially as and for the purpose described.

In testimony whereof I affix my signature in presence of two witnesses.

JOHN CONWAY.

Witnesses:
  MANUS O'DONNELL,
  MARTIN O'DONNELL.